(12) United States Patent
Kanteti

(10) Patent No.: US 11,113,374 B2
(45) Date of Patent: Sep. 7, 2021

(54) MANAGING SEAMLESS ACCESS TO LOCKS WITH PERSON/HEAD DETECTION

(71) Applicant: Carrier Corporation, Palm Beach Gardens, FL (US)

(72) Inventor: Neeraja Kanteti, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 193 days.

(21) Appl. No.: 16/128,847

(22) Filed: Sep. 12, 2018

(65) Prior Publication Data
US 2019/0325674 A1 Oct. 24, 2019

(51) Int. Cl.
| | | |
|---|---|---|
| H04W 4/80 | (2018.01) | |
| G07C 9/00 | (2020.01) | |
| G06F 21/32 | (2013.01) | |
| G07C 9/25 | (2020.01) | |
| G07C 9/26 | (2020.01) | |

(52) U.S. Cl.
CPC ......... *G06F 21/32* (2013.01); *G07C 9/00174* (2013.01); *G07C 9/257* (2020.01); *H04W 4/80* (2018.02); *G07C 9/26* (2020.01)

(58) Field of Classification Search
USPC ....................................................... 713/186
See application file for complete search history.

(56) References Cited

U.S. PATENT DOCUMENTS

| | | | |
|---|---|---|---|
| 7,446,862 B2 | 11/2008 | Zambon | |
| 8,868,376 B2 | 10/2014 | De Coi | |
| 9,195,305 B2 | 11/2015 | Markovic et al. | |
| 9,437,063 B2* | 9/2016 | Schoenfelder | G07C 9/00309 |
| 9,514,585 B2 | 12/2016 | Ahearn et al. | |
| 10,163,285 B2* | 12/2018 | Schoenfelder | H04W 12/062 |
| 10,490,000 B2* | 11/2019 | Schoenfelder | H04L 63/08 |

(Continued)

FOREIGN PATENT DOCUMENTS

| | | |
|---|---|---|
| CN | 202117430 U | 1/2012 |
| CN | 203552331 U | 4/2014 |

(Continued)

OTHER PUBLICATIONS

LAD: Learning Access Control Polices and Detecting Access Anomalies in Smart Environments Kalbarczyk et al, (Year: 2019).*

(Continued)

*Primary Examiner* — Jahangir Kabir
(74) *Attorney, Agent, or Firm* — Cantor Colburn LLP

(57) ABSTRACT

A method of managing seamless access to locks with person/head detection is provided and includes receiving, at a mobile device, a signal from an access control device that includes a camera sensor. The signal includes an identifier of the access control device and a status of a region of interest of the camera sensor. It is determined that the mobile device includes a credential that is authorized to unlock the access control device. Based on the signal it is determined whether a person is in the region of interest of the camera sensor and moving towards the access control device. A request is transmitted to the access control device to unlock the access control device based at least in part on determining that a person is in the region of interest of the camera sensor and moving towards the access control device.

8 Claims, 4 Drawing Sheets

(56) References Cited

U.S. PATENT DOCUMENTS

| | | | |
|---|---|---|---|
| 2012/0118947 A1* | 5/2012 | Lyons | G07F 17/3241 |
| | | | 235/375 |
| 2014/0057567 A1 | 2/2014 | Desai et al. | |
| 2015/0271629 A1 | 9/2015 | Knaappila et al. | |
| 2016/0007289 A1 | 1/2016 | Weizman et al. | |
| 2016/0036908 A1 | 2/2016 | Aggarwal et al. | |
| 2016/0098877 A1* | 4/2016 | Tokudome | G01V 3/02 |
| | | | 340/5.72 |
| 2016/0358437 A1 | 12/2016 | Johnson et al. | |
| 2017/0148243 A1 | 5/2017 | Shin et al. | |
| 2017/0166166 A1 | 6/2017 | Lindic et al. | |
| 2017/0193723 A1* | 7/2017 | Park | E05B 49/00 |
| 2017/0263065 A1 | 9/2017 | Johnson | |
| 2017/0323123 A1 | 11/2017 | Rabb et al. | |
| 2021/0021999 A1* | 1/2021 | Ramie | H04L 63/0861 |

FOREIGN PATENT DOCUMENTS

| | | |
|---|---|---|
| DE | 102007035513 A1 | 2/2009 |
| EP | 2434463 A2 | 3/2012 |
| WO | 2017180388 A1 | 10/2017 |
| WO | 2018025086 A1 | 2/2018 |

OTHER PUBLICATIONS

Yang et al., "An Intelligent Automated Door Control System Based on a Smart Camera" May 10, 2013, 11 pages.

Extended European Search Report for Application No. 19169938.8-1009, dated Sep. 18, 2019, 10 pages.

\* cited by examiner

MANAGING SEAMLESS ACCESS TO LOCKS WITH PERSON/HEAD DETECTION

CROSS-REFERENCE TO RELATED APPLICATIONS

This application claims the benefit of Indian Application No. 201811014892 filed Apr. 19, 2018, which is incorporated herein by reference in its entirety.

BACKGROUND

The subject matter disclosed herein generally relates to the field of access control systems, and more particularly to an apparatus and method for managing seamless access to locks with person/head detection.

In building complexes such as universities or office premises, seamless mobile access can be provided to controlled spaces. Seamless mobile access allows individuals who have valid mobile credentials on their mobile device to gain automatic access to a controlled space without having to reach for and click an open command from their mobile device, or present a key card to a reader on an access control device. Seamless mobile access can become a challenge when two or more access control devices, such as door locks, are adjacent each other as the strength of the signals being emitted from the access control devices can appear to be the same or nearly the same to the mobile device. The mobile credentialing system on the mobile device selects one lock to unlock, and this typically is the first lock that it discovers. This may not be the lock on the door that the user intends to open. For example, in the case where Lock A and Lock B are within a close distance, such as one meter, of each other and a user with valid permissions on both Lock A and Lock B approaches Lock A, Lock B may open instead of Lock A even though the user is moving towards Lock A.

BRIEF SUMMARY

According to an embodiment, a method of managing seamless access to locks with person/head detection includes receiving, at a mobile device, a signal from an access control device that contains information from a camera sensor. The signal includes an identifier of the access control device and a status of a region of interest of the camera sensor. It is determined that the mobile device includes a credential that is authorized to unlock the access control device. Based on the signal it is determined whether a person is in the region of interest of the camera sensor and moving towards the access control device. A request is transmitted to the access control device to unlock the access control device based on determining that the person is in the region of interest of the camera sensor and moving towards the access control device. The request includes the credential.

In addition to one or more of the features described above or below, or as an alternative, further embodiments of the method may include the receiving and transmitting being via a short-range wireless communication interface.

In addition to one or more of the features described above or below, or as an alternative, further embodiments of the method may include the short-range wireless communication interface being Bluetooth.

In addition to one or more of the features described above or below, or as an alternative, further embodiments of the method may include the determining whether the person is moving towards the access control device including applying face detection algorithm to an image captured by the camera sensor, wherein it is determined that the person is moving towards the access control device based on the face detection software detecting at least a portion of a face of the person in the image.

In addition to one or more of the features described above or below, or as an alternative, further embodiments of the method may include the access control device being a lock on a door.

In addition to one or more of the features described above or below, or as an alternative, further embodiments of the method may include the mobile device being a smartphone.

According to another embodiment, a system is configured to manage seamless access to locks with person/head detection. The system includes a processor and a memory having computer-executable instructions that, when executed by the processor, cause the processor to perform operation. The operations include receiving, at a mobile device, a signal from an access control device that includes a camera sensor. The signal includes an identifier of the access control device and a status of a region of interest of the camera sensor. It is determined that the mobile device includes a credential that is authorized to unlock the access control device. Based on the signal it is determined whether a person is in the region of interest of the camera sensor and moving towards the access control device. A request is transmitted to the access control device to unlock the access control device based on determining that a person is in the region of interest of the camera sensor and moving towards the access control device. The request includes the credential.

In addition to one or more of the features described above or below, or as an alternative, further embodiments of the system may include the receiving and transmitting being via a short-range wireless communication interface.

In addition to one or more of the features described above or below, or as an alternative, further embodiments of the system may include the short-range wireless communication interface being Bluetooth.

In addition to one or more of the features described above or below, or as an alternative, further embodiments of the system may include the determining whether the person is moving towards the access control device including applying a face detection algorithm to an image captured by the camera sensor, wherein it is determined that the person is moving towards the access control device based at least in part on the face detection algorithm detecting at least a portion of a face of the person in the image.

In addition to one or more of the features described above or below, or as an alternative, further embodiments of the system may include the access control device being a lock on a door.

In addition to one or more of the features described above or below, or as an alternative, further embodiments of the system may include the mobile device being a smartphone.

According to an embodiment, a method of managing seamless access to locks with person/head detection includes receiving, at an access control device, a status of a region of interest of a camera sensor that is contained in the access control device, the access control device in a locked state. The method also includes receiving, at the access control device, a request from a mobile device to unlock the access control device. The request includes a credential. It is determined, based at least in part on the credential, that the mobile device is authorized to unlock the access control device. It is determined, based on the status, whether a person is in the region of interest of the camera sensor and moving towards the access control device. The access control device is unlocked based on determining that a person is in the region of interest of the camera sensor and moving towards the access control device.

In addition to one or more of the features described above or below, or as an alternative, further embodiments of the method may include the access control device and the mobile device being in communication via a short-range wireless communication interface.

In addition to one or more of the features described above or below, or as an alternative, further embodiments of the method may include the short-range wireless communication interface being Bluetooth.

In addition to one or more of the features described above or below, or as an alternative, further embodiments of the method may include the camera sensor being inside the access control device and connected to a Bluetooth chip in the access control device to send advertisement parameters based on detecting a face in the field of view of the camera.

In addition to one or more of the features described above or below, or as an alternative, further embodiments of the method may include the determining whether the person is moving towards the access control device including applying a face detection algorithm to an image captured by the camera sensor, wherein it is determined that the person is moving towards the access control device based at least in part on the detection algorithm detecting at least a portion of a face of the person in the image.

In addition to one or more of the features described above or below, or as an alternative, further embodiments of the method may include the access control device being a lock on a door.

In addition to one or more of the features described above or below, or as an alternative, further embodiments of the method may include the mobile device being a smartphone.

Technical effects of embodiments of the present disclosure include the ability improve seamless access by predicting which access control device should be unlocked when two access control devices are proximate to each other and a user has access to both access control devices. Technical effects of embodiments of the present disclosure also include the ability to determine when a user is close to and walking towards an access control device, such as a lock, and opening the lock only when the user is close to the lock and walking towards the lock.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

Figure 1:
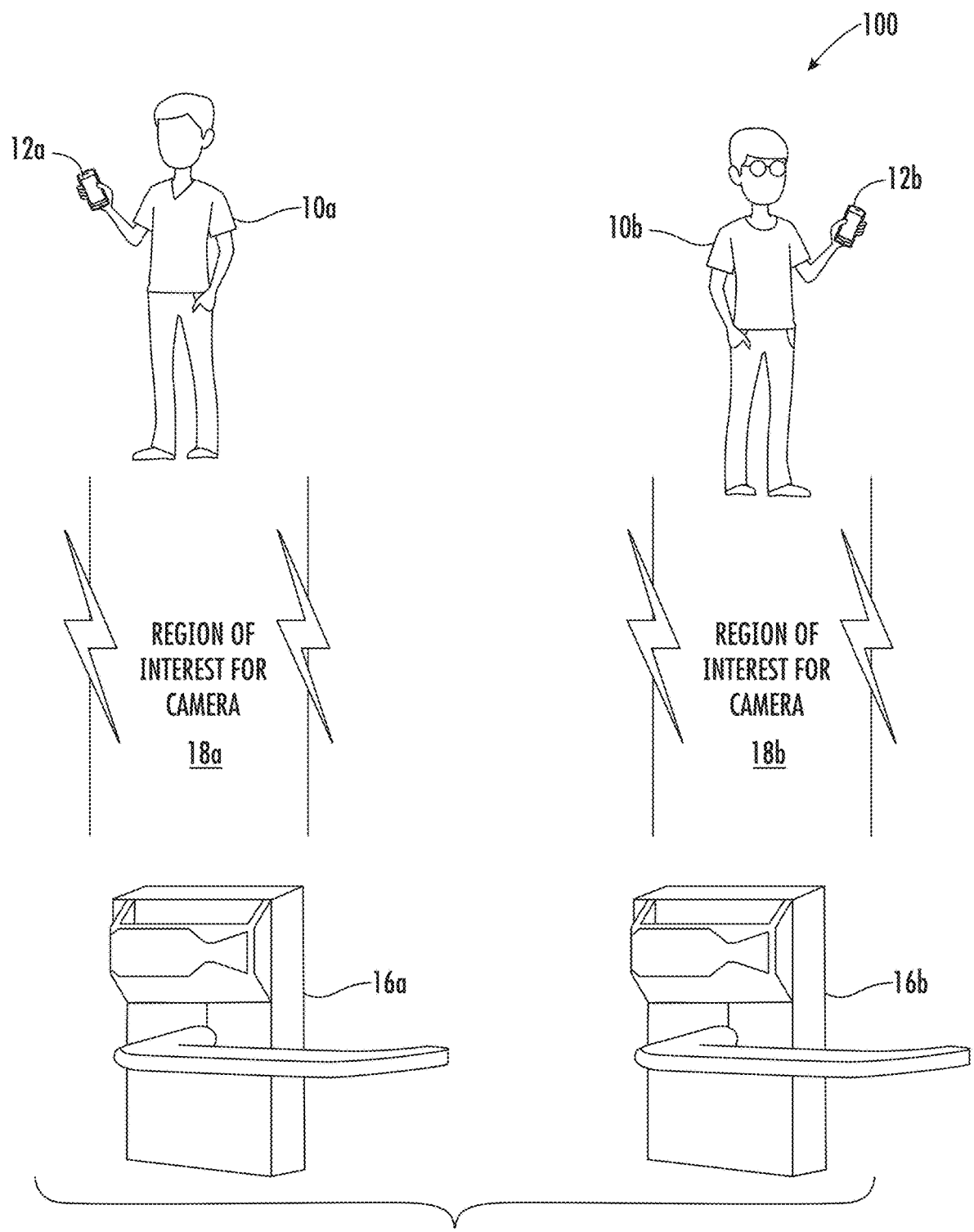
FIG. 1 illustrates a general schematic system diagram of an access control system, in accordance with an embodiment of the disclosure.

A detailed description of one or more embodiments of the disclosed apparatus and method are presented herein by way of exemplification and not limitation with reference to the Figures.

In accordance with an embodiment, a camera sensor, or camera, is added to an access control device of a mobile credentialing system. The camera senses a person's presence when the person walks near the access control device (e.g., within five to seven meters of the access control device) and the person is within a region of interest of the camera. The camera can send a "near" or "far" signal to the access control device. The "near" signal can indicate that a person has been detected and is moving towards the access control device, and the "far" signal can indicate that the person who has been detected is not moving towards the access control device. In accordance with an embodiment, when a request to unlock the access control device is received from a mobile device, the access control device unlocks the access control device only if it has received a "near" signal from the camera sensor indicating that a person is in a region of interest of the camera and moving towards the access control device.

In accordance with another embodiment, the access control device advertises it's near/far status to mobile devices within a transmission range of the access control device, and a mobile credentialing system on the mobile device sends an unlock, or open command, to the access control device only when the access control device advertises a status of "near" to indicate that a person is moving towards the access control device. In this embodiment, the camera sensor scans a region of interest, or field of view to determine if a person is in the field of view. The camera sensor, or processor located inside the access control device, determines whether the person is moving towards the camera, using for example face detection software to implement, or execute, a face detection algorithm. The access control device updates it advertisement (e.g., its Bluetooth Low Energy or BTLE advertisement) to include an indicator that indicates, for example, that a person is not in the field of view ("empty"), that a person is in the field of view and is not moving towards the access control device ("far"), or that a person is in the field of view and is moving towards the access control device ("near"). A mobile device receiving advertisements from multiple access control devices can filter the advertisements and select one where a person is moving towards the access control device. The mobile device can connect to the selected access control device to send a credential to open the access control device.

Benefits of embodiments described herein include improving seamless access to nearby locks by allowing the correct lock to open. When implemented, for example, at a hotel this can lead to fewer guest complaints about incorrect doors being unlocked and doors they intend to open remaining locked.

As used herein, the term "face detection" refers to computer technology that is able to identify the presence of people's faces within digital images. Face detection applications can use machine learning algorithms to detect human faces within larger images that may contain numerous objects that aren't faces such as landscapes, buildings and other parts of humans (e.g. legs, shoulders and arms). Face detection refers to identifying that there is a human face present in an image or video. Face detection algorithms often begin by searching for human eyes which can be one of the easiest features to detect. Once eyes are detected, the algorithm might then attempt to detect facial regions including eyebrows, the mouth, nose, nostrils and the iris. Once the algorithm surmises that it has detected a facial region, it can then apply additional tests to validate whether it has, in fact, detected a face. Examples of face detection software that can be implemented by embodiments described herein include, but are not limited to Open Source Computer Vision (OpenCV). Face detection algorithms detect and track the head in an image based, for example, on the noticeable different between heads and shoulder in the input images. They can also detect face orientations by examining if the face contains eyes, a nose, and mouth to determine whether a person is facing, or moving towards, an access control device, or lock.

As used herein, the term "person detection" refers to computer technology that is able to identify the presence of a person within digital images. Person detection algorithms can identify the sequence of images that contain humans and separate out objects in an image (if any). Once a person or human presence is evident, then face detection algorithms can be applied to see if a person is moving towards an access control device, or lock (e.g., facing the access control device, or lock).

Turning now to FIG. 1, a general schematic system diagram of an access control system 100 is generally shown, in accordance with an embodiment of the disclosure. The system includes mobile devices 12 and access control devices 16. It should be appreciated that while two access control devices 16 are illustrated, the access control system 100 may include any number of access control devices 16. The mobile devices 12 shown in FIG. 1 can be implemented, for example, by a wireless capable handheld device such as a smartphone that is operable to implement a mobile credentialing system via hardware and/or software located on the mobile device 12. In an embodiment, the access control devices include a camera sensor to detect when a person 10 is in a region of interest 18.

As shown in FIG. 1, person 10a is holding a mobile device 12a. The mobile device 12a is not limited to being located in a person's 10a hand as shown in FIG. 1, as it can be in a location that is proximate to the person 10a such as, but not limited to: a pocket in clothing worn by the person 101; and in a purse or briefcase of the person 10a. As shown in FIG. 1, person 10a is located in a region of interest 18a of access control device 16a. Also as shown in FIG. 1, person 10b, who is holding mobile device 12b, is not in a region of interest 18b of access control device 16b. Thus, in accordance with an embodiment described herein, access control device 16a will unlock in response to a request with a valid credential from mobile device 12a, while access control device 16b will not unlock in response to a request with a valid credential from mobile device 12b. This is due at least in part on user 10a being physically located within the region of interest 18a of access control device 16a and person 10b not being physically located with the region of interest 18b of access control device 16b. This is different than contemporary implementations of seamless access to locks which do not take into account physical locations of users, and would result in both access control devices 16 unlocking in response to receiving valid credentials from the mobile devices 12.

In accordance with an embodiment, a camera sensor is a low resolution camera with low power that is very small in size such as, but not limited to: an Ov7251 global shutter image sensor from OmniVision; and a visual sensor from Emza Visual Sense. In an embodiment, the camera sensors are located within the access control devices 16 and communicate to the access control devices 16 via a host range and/or near field communication method. The short-range wireless communication interface can be implemented by any short-range wireless communication method known in the art such as, but not limited to: Wi-Fi, Bluetooth, Zigbee, and infrared.

In an embodiment, the region of interest 18a is determined by selecting or configuring the area of view of a camera that is likely to capture movements of a person.

In an embodiment, the access control devices 16 include a lock and controls access through a door. It should be appreciated that the access control system 100 may include any number of doors and rooms. Further, there may be multiple doors and access control devices 16 for each room.

For a selected period of time (e.g., a period of stay of a hotel guest at a hotel) a mobile device 12 associated with a hotel guest may be granted access to one or more access control devices 16 (e.g., the door lock on a hotel room assigned to the hotel guest). When a person checks in to the hotel, their mobile device 12 is granted access to a room. There may be one or more mobile devices 12 assigned to a hotel room (e.g., one for each occupant of the room), thus embodiments disclosed herein may apply to multiple mobile devices 12 per room. A hotel guest uses the mobile device 12 to unlock and/or lock the access control device 16 operably connected to their assigned room. The access control devices 16 advertise their presence to the mobile devices 12 via short-range wireless and/or near field communication methods. The state of an access control device 16 can be changed from locked to unlocked through an access request from a mobile device 12, with the correct credential, being sent to the access control device 16 via a short-range wireless communication interface) or Bluetooth interface. The short-range wireless communication interface can be implemented by any short-range wireless communication method known in the art such as, but not limited to: Wi-Fi, Bluetooth, Zigbee, and infrared.

The mobile device 12 may store credentials to unlock and/or lock the access control device 16. Some credentials may be used for multiple access control devices 16 if there are multiple access control devices 16 for a single assigned room or the hotel guest is assigned access to multiple rooms. For example, an access control device 16 operably connected to a hotel room and an access control device 16 operably connected to a hotel pool may respond to the same credential. Other credentials may be specific to a single access control device 16.

The access control device 16 may be a wireless-capable, restricted-access, or restricted-use device such as a wireless lock, access control reader for building entry, and other restricted-use machine. The mobile device 12 submits credentials to the access control device 16, thereby selectively permitting a user to access or activate functions of the access control device 16. A mobile device 12 may, for example, submit a credential to an electromechanical lock to unlock it, and thereby gain access to a room at the hotel.

Figure 2:
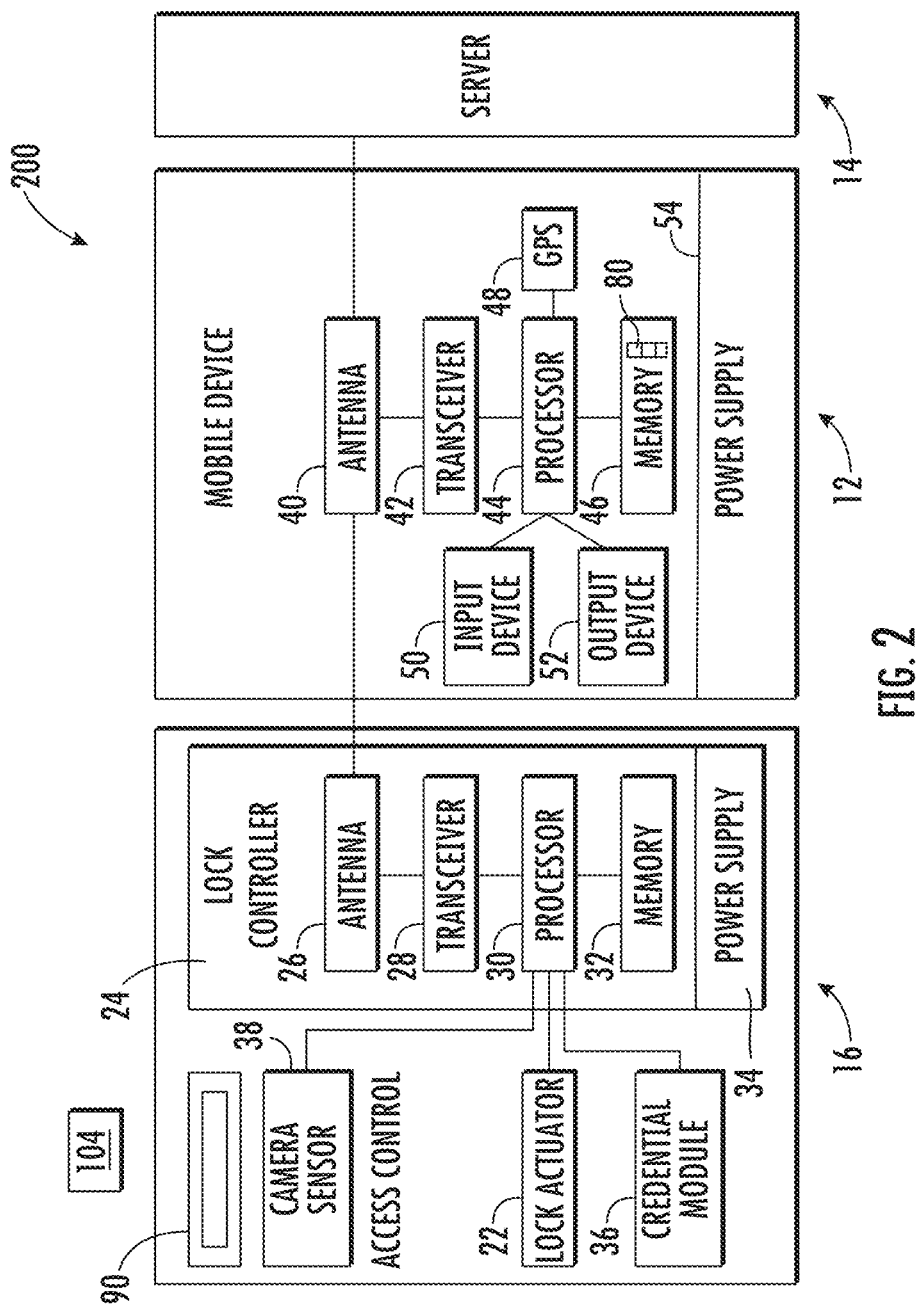
FIG. 2 illustrates a block diagram of an access control device, mobile device and server of the access control system of FIG. 1, in accordance with an embodiment of the disclosure.

With reference to FIG. 2, a block diagram of an example electronic lock system 200 includes an access control device 16, a mobile device 12 and a server 14. The access control device 16 generally includes a lock actuator 22, a lock controller 24, a lock antenna 26, a lock transceiver 28, a lock processor 30, a lock memory 32, a lock power supply 34, a lock card reader 90, a camera sensor 38, and a credential module 36. The access control device 16 may have essentially two readers, one reader 90 to read a physical key card 104 and the credential module 36 to communicate with the mobile device 12 via the lock processor 30 and the transceiver 28 and antenna 26. The access control device 16 is responsive to credentials from the mobile device 12, and may, for example, be the lock of a turnstile or a door lock. Although the present disclosure focuses primarily on credentials for access control, it should be appreciated that other systems wherein credentials are transmitted from a mobile device to an access control device so as to identify the user to an online system or validate user access rights or permissions in an offline system will benefit herefrom.

Upon receiving and authenticating an appropriate credential from the mobile device 12 using the credential module 36, or after receiving card data from lock card reader 90, the lock controller 24 commands the lock actuator 22 to lock or unlock a mechanical or electronic lock. In this manner, a lock state of the access control device 16 changes from one state to another state. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, infrared, Zigbee, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate credentials and determine the access rights contained in the credentials or to pass messages from a transceiver to a credential module 36 and to receive a response indication back from the credential module 36. The lock memory 32 may be RAM, EEPROM, or other storage medium where the lock processor 30 can read and write. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

While FIG. 2 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, and a key power supply 54. The key transceiver 42 is a transceiver of a type corresponding to the lock transceiver 28, and the key antenna 40 is a corresponding antenna 26. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. The mobile device 12 may also include a mobile device application 80 for implementing a mobile credentialing system. Embodiments disclosed herein, may operate through the mobile device application 80 installed on the mobile device 12.

Figure 3:
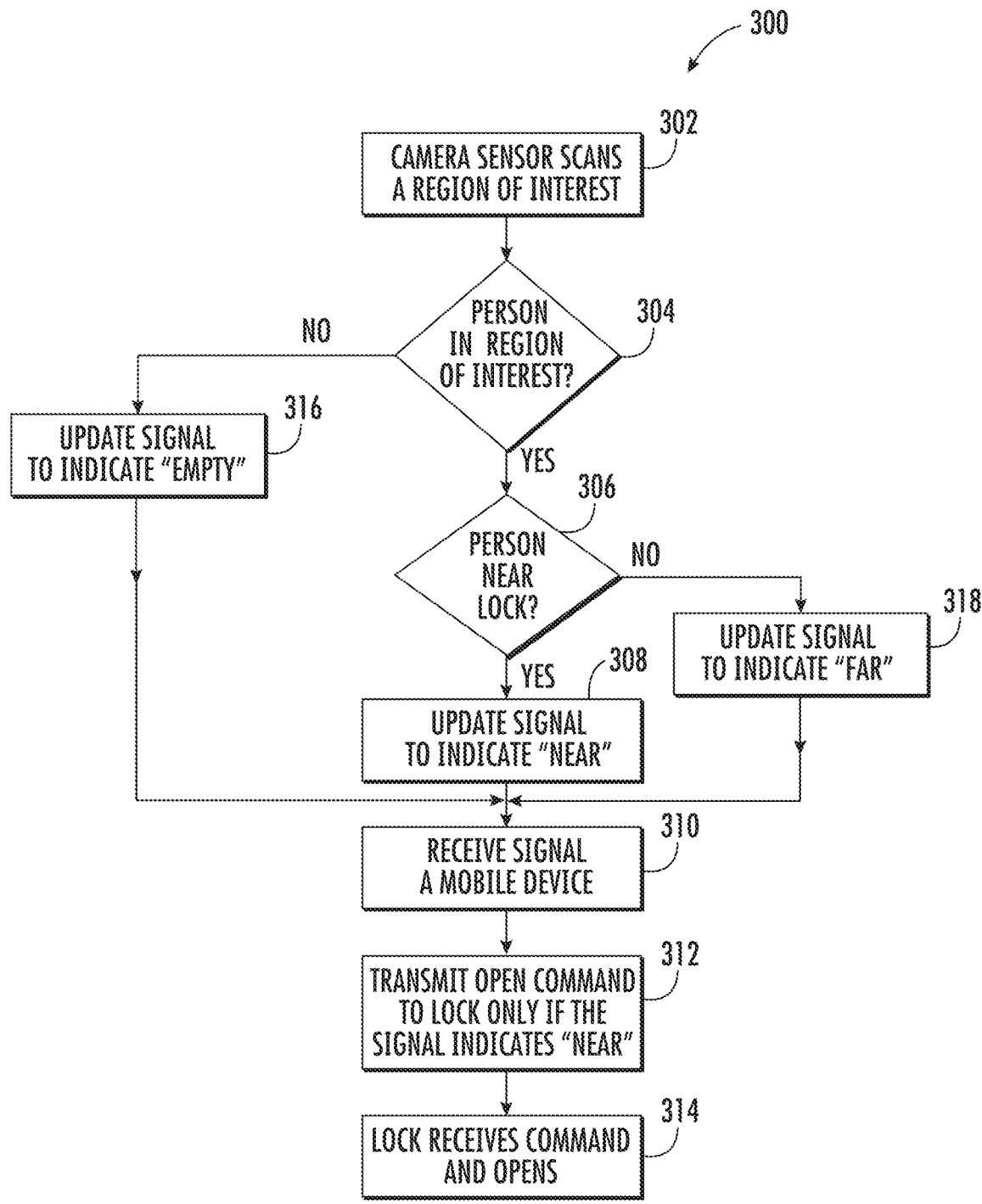
FIG. 3 is a flow diagram illustrating a method of managing seamless access to locks, in accordance with an embodiment of the disclosure.

Turning now to FIG. 3, a flow diagram 300 illustrating a method of managing seamless access to locks is generally shown in accordance with an embodiment of the disclosure. In an embodiment, the processing shown in FIG. 3 is implemented by the mobile device application 80 and the processor 30 shown in FIG. 2. At block 302, a camera sensor within or proximate to an access control device (e.g., lock) scans a region of interest and at block 304 it is determined whether a person is in the scanned region of interest. As described previously herein, person detection software can be used to determine whether a person is in the region of interest, or field of view, of the camera sensor. Processing continues at block 316 if it is determined at block 304, no person is detected in the region of interest of the camera. At block 316, a signal that is advertised (or transmitted) by an access control device, such as access control device 16 of FIG. 2, is updated to indicate a status of "empty." Once the signal is updated at block 316, processing continues at block 310.

If it is determined at block 304, that a person is detected in the region of interest of the camera sensor, then processing continues at block 306. At block 306, it is determined whether the detected person is located "near" the lock 306. In an embodiment, a person is determined to be "near" the lock when the person is within the region of interest and appears to be moving towards, or facing, the lock. In an embodiment, the person appears to be facing the lock when an image captured by the camera includes a sufficient facial image of a person. A sufficient image can range from detecting a complete face to detecting a subset of a face such as an eye or a nose. In an embodiment, what constitutes a sufficient facial image of a person can be modified by a system administrator based on user requirements. In an embodiment, a person is determined not to be "near" the lock when the person is walking by the lock, and thus for example, just an ear and a side view of a face is detected, by the face detection software, in the image captured by the camera. In an embodiment, a person is determined not to be "near" the lock when the person is facing directly away from the lock, and thus for example, just a back of a head is detected, by the face detection software, in the image captured by the camera.

If it is determined at block 306, that a person is "near" the lock, then processing continues at block 308. At block 308, a signal that is advertised (or transmitted) by an access control device is updated to indicate a status of "near." Once the signal is updated at block 308, processing continues at block 310.

If it is determined at block 306, that a person is not "near" the lock, then processing continues at block 318. At block 318, a signal that is advertised (or transmitted) by an access control device is updated to indicate a status of "far." Once the signal is updated at block 318, processing continues at block 310.

Turning now to block 310 of FIG. 3, a mobile device application, such as mobile device application 80 of FIG. 2, executing on a mobile device, such as mobile device 12 of FIG. 2, receives a signal from the access control device. In an embodiment, in order to receive the signal, the mobile device must be within the transmission range of the access control device. The mobile device transmits an open command with a credential to the access control device at block 312 only if the signal from the access control device indicates a status of "near" which in accordance with an embodiment means that a sufficient facial image of a person has been detected by the camera sensor that is contained in and/or coupled to the access control device. At block 314, the access control device receives the open command along with an authorized credential and opens the lock.

In an embodiment, blocks 306 and 318 are skipped, and when the mobile device is within the transmission range of the access control device and it has been determined at block 304 that a person is in the region of interest then block 308 is performed. In this embodiment, the region of interest of the camera sensor can be reduced to make it likely that a person in the region of interested intends to unlock the access control device containing or proximate to the camera sensor.

In an embodiment, the determining at block 304 is performed by person detection software and/or hardware executing on a camera sensor, such as camera sensor 38 of FIG. 2. In another embodiment, the determining at block 304 is performed by person detection software and/or hardware executing on a processor, such as processor 30 of FIG. 2, of an access control device. In an embodiment, the determining at block 304 is performed by face detection software and/or hardware executing on a camera sensor, such as camera sensor 38 of FIG. 2. In an embodiment, the determining at block 306 is performed by face detection software and/or hardware executing on a processor, such as processor 30 of FIG. 2, of an access control device.

While the above description has described the flow process of FIG. 3 in a particular order, it should be appreciated that unless otherwise specifically required in the attached claims that the ordering of the steps may be varied.

Figure 4:
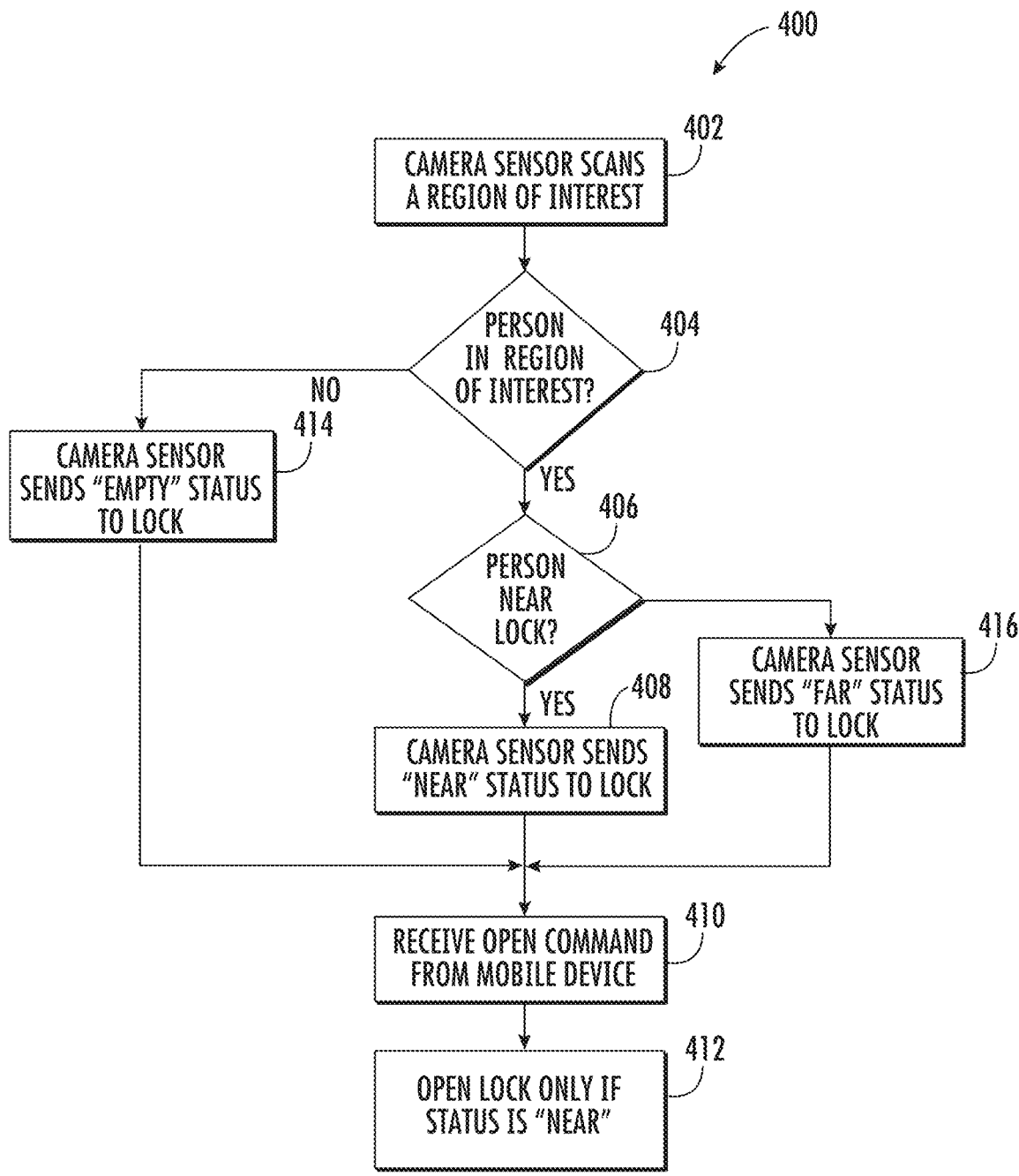
FIG. 4 is a flow diagram illustrating a method of managing seamless access to locks, in accordance with an embodiment of the disclosure.

Turning now to FIG. 4, a flow diagram 400 illustrating a method of managing seamless access to locks is generally shown in accordance with an embodiment of the disclosure. In an embodiment, the processing shown in FIG. 4 is implemented by the mobile device application 80 and the processor 30 shown in FIG. 2. At block 402, a camera sensor within or proximate to an access control device (e.g., lock) scans a region of interest and at block 404 it is determined whether a person is in the scanned region of interest. As described previously herein, person detection software can be used to determine whether a person is in the region of interest, or field of view, of the camera sensor. Processing continues at block 414 if it is determined at block 404, no person is detected in the region of interest of the camera. At block 414, a status of "empty" is communicated to the access control device. Once the status is updated at block 414, processing continues at block 410.

If it is determined at block 404, that a person is detected in the region of interest of the camera sensor, then processing continues at block 406. At block 406, it is determined whether the detected person is located "near" the lock 406. If it is determined at block 406, that a person is "near" the lock, then processing continues at block 408. At block 408, a status of "near" is communicated to the access control device. Once the status is updated at block 408, processing continues at block 410.

If it is determined at block 406, that a person is not "near" the lock, then processing continues at block 416. At block 416, a status of "far" is communicated to the access control device. Once the status is updated at block 416, processing continues at block 410.

Turning now to block 410 of FIG. 4, an "open" command is received at an access control device from a mobile device. At block 412, the access control device opens the lock only if the status is "near" and the open command includes a credential authorized to open the lock.

In an embodiment, blocks 406 and 414 are skipped, and the access control device opens the lock at block 412 when the access control device receives an "open" command at block 410 with a credential authorized to open the lock and it has been determined at block 404 that a person is in the region of interest. In this embodiment, the region of interest of the camera sensor can be reduced to make it likely that a person in the region of interested intends to unlock the access control device containing or proximate to the camera sensor.

In an embodiment, the determining at block 404 is performed by person detection software and/or hardware executing on a camera sensor, such as camera sensor 38 of FIG. 2. In another embodiment, the determining at block 404 is performed by person detection software and/or hardware executing on a processor, such as processor 30 of FIG. 2, of an access control device. In an embodiment, the determining at block 404 is performed by face detection software and/or hardware executing on a camera sensor, such as camera sensor 38 of FIG. 2. In an embodiment, the determining at block 406 is performed by face detection software and/or hardware executing on a processor, such as processor 30 of FIG. 2, of an access control device.

While the above description has described the flow process of FIG. 4 in a particular order, it should be appreciated that unless otherwise specifically required in the attached claims that the ordering of the steps may be varied.

While embodiments have been described herein in terms of a hotel, it will be appreciated that embodiments can be utilized in any environment where people regularly occupy defined locked locations such as, but not limited to office spaces or campus dormitories.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of managing seamless access to locks, the method comprising:
    receiving, at a mobile device, signals from a plurality of access control devices, each access control device including a camera sensor, and each signal comprising an identifier of a sending access control device and a status of a region of interest of the camera sensor of the sending access control device;
    determining that the mobile device comprises a credential that is authorized to unlock the plurality of access control devices;
    determining, based on the signal, whether a person is in the region of interest of the camera sensor of one of the plurality of access control devices and moving towards the one of the plurality of access control devices; and
    transmitting a request, to the one of the plurality of access control devices and not to any other of the plurality of access control devices, to unlock the one of the plurality of access control devices based on determining that a person is in the region of interest of the camera sensor of the one of the plurality of access control devices and moving towards the one of the plurality of access control devices, the request including the credential,
    wherein the receiving and transmitting are via a short-range wireless communication interface that is initiated in response to the mobile device being within a transmission range of transceivers on the plurality of access control devices.

2. The method of claim 1, wherein the short-range wireless communication interface is Bluetooth.

3. The method of claim 1, wherein the plurality of access control devices are locks on one or more doors.

4. The method of claim 1, wherein the mobile device is a smartphone.

5. A system configured to manage seamless access to locks, the system comprising:
    a processor; and
    a memory comprising computer-executable instructions that, when executed by the processor, cause the processor to perform operations, the operations comprising:
        receiving, at a mobile devices signals from a plurality of access control devices, each access control device including a camera sensor, and each signal comprising an identifier of a sending access control device and a status of a region of interest of the camera sensor of the sending access control device;
        determining that the mobile device comprises a credential that is authorized to unlock the plurality of access control devices;
        determining, based on the signal, whether a person is in the region of interest of the camera sensor of one of the plurality of access control devices and moving towards the one of the plurality of access control devices; and
    transmitting a request, to the one of the plurality of access control devices and not to any other of the plurality of access control devices, to unlock the one of the plurality of access control devices based on determining that a person is in the region of interest of the camera sensor of the one of the plurality of access control devices and moving towards the one of the plurality of access control devices, the request including the credential,
    wherein the receiving and transmitting are via a short-range wireless communication interface that is initiated in response to the mobile device being within a transmission range of transceivers on the plurality of access control devices.

6. The system of claim 5, wherein the short-range wireless communication interface is Bluetooth.

7. The system of claim 5, wherein the plurality of access control devices are locks on one or more doors.

8. The system of claim 5, wherein the mobile device is a smartphone.

* * * * *